(12) United States Patent
Suetsugu et al.

(10) Patent No.: US 10,704,010 B2
(45) Date of Patent: *Jul. 7, 2020

(54) GREASE AND METHOD FOR MANUFACTURING GREASE

(71) Applicant: IDEMITSU KOSAN CO., LTD., Chiyoda-ku (JP)

(72) Inventors: Yoshiyuki Suetsugu, Sodegaura (JP); Hiromu Kumagai, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/549,036

(22) PCT Filed: Feb. 4, 2016

(86) PCT No.: PCT/JP2016/053363
§ 371 (c)(1),
(2) Date: Aug. 4, 2017

(87) PCT Pub. No.: WO2016/125859
PCT Pub. Date: Aug. 11, 2016

(65) Prior Publication Data
US 2018/0037842 A1 Feb. 8, 2018

(30) Foreign Application Priority Data

Feb. 5, 2015 (JP) .................. 2015-021587
Feb. 5, 2015 (JP) .................. 2015-021589
Feb. 6, 2015 (JP) .................. 2015-022709

(51) Int. Cl.
*C10M 171/06* (2006.01)
*C10M 177/00* (2006.01)
(Continued)

(52) U.S. Cl.
CPC ....... *C10M 171/06* (2013.01); *B01F 7/00816* (2013.01); *B01J 19/0066* (2013.01);
(Continued)

(58) Field of Classification Search
CPC .............. C10M 171/06; C10M 115/08; C10M 169/02; C10M 177/00; C10M 2203/1025;
(Continued)

(56) References Cited

U.S. PATENT DOCUMENTS 5,707,944 A    1/1998  Yokouchi et al.
6,037,314 A *  3/2000  Kondo ................. C10M 169/06
                                                         508/363

(Continued)

FOREIGN PATENT DOCUMENTS

CN    101988022 A    3/2011
JP    2-4895 A       1/1990
(Continued)

OTHER PUBLICATIONS

Office Action dated Jan. 8, 2019 in Japanese Patent Application No. 2015-021587, 6 pages (with English translation).
(Continued)

*Primary Examiner* — James C Goloboy
(74) *Attorney, Agent, or Firm* — Oblon, McClelland, Maier & Neustadt, L.L.P.

(57) ABSTRACT

A grease of the invention contains a base oil and a thickener, where, when the volumetric-based arithmetic mean particle size of particles contained in the grease measured using laser diffraction/scattering method is A (unit: μm), a formula A≤3 (1) is satisfied.

22 Claims, 6 Drawing Sheets

(51) Int. Cl.
*B01F 7/00* (2006.01)
*B01J 19/18* (2006.01)
*B01J 19/00* (2006.01)
*C10M 115/08* (2006.01)
*C10M 169/02* (2006.01)

(52) U.S. Cl.
CPC ........ *B01J 19/1806* (2013.01); *C10M 115/08* (2013.01); *C10M 169/02* (2013.01); *C10M 177/00* (2013.01); *B01J 2219/00779* (2013.01); *C10M 2203/1025* (2013.01); *C10M 2205/0285* (2013.01); *C10M 2207/106* (2013.01); *C10M 2215/1026* (2013.01); *C10M 2217/0456* (2013.01); *C10M 2219/0445* (2013.01); *C10N 2210/01* (2013.01); *C10N 2210/02* (2013.01); *C10N 2220/022* (2013.01); *C10N 2220/082* (2013.01); *C10N 2230/76* (2013.01); *C10N 2250/10* (2013.01); *C10N 2270/00* (2013.01)

(58) Field of Classification Search
CPC .... C10M 2205/0285; C10M 2207/106; C10M 2215/1026; C10M 2217/0456; C10M 2219/0445; C10N 2250/10; C10N 2220/082; C10N 2210/01; C10N 2210/02; C10N 2220/02; C10N 2270/00; B01J 19/0066; B01J 19/1806; B01F 7/00816
See application file for complete search history.

(56) References Cited

U.S. PATENT DOCUMENTS

| | | | |
|---|---|---|---|
| 6,136,762 A | 10/2000 | Yoshinari et al. | |
| 10,150,929 B2 * | 12/2018 | Suetsugu | C10M 177/00 |
| 2002/0039973 A1 | 4/2002 | Baum et al. | |
| 2003/0176298 A1 * | 9/2003 | Nakatani | C10M 123/06 508/398 |
| 2010/0190668 A1 * | 7/2010 | Hishinuma | C10M 169/02 508/182 |
| 2014/0155306 A1 * | 6/2014 | Schweigkofler | C10M 113/12 508/144 |
| 2016/0177214 A1 | 6/2016 | Suetsugu | |
| 2017/0253826 A1 * | 9/2017 | Suetsugu | C10M 177/00 |

FOREIGN PATENT DOCUMENTS

| | | |
|---|---|---|
| JP | 3-190996 A | 8/1991 |
| JP | 11-21580 A | 1/1999 |
| JP | 2000-248290 A | 9/2000 |
| JP | 2003-253286 A | 9/2003 |
| JP | 2009-235283 A | 10/2009 |
| JP | 2010-174138 A | 8/2010 |
| JP | 2013-535545 A | 9/2013 |
| JP | 2013-535546 A | 9/2013 |
| JP | 2014-208851 A | 11/2014 |
| JP | 2015-30838 A | 2/2015 |
| JP | 6026971 B2 | 11/2016 |
| WO | WO 2007/007664 A1 | 1/2007 |
| WO | 2014/191470 A2 | 12/2014 |
| WO | WO 2015/182242 A1 | 12/2015 |
| WO | WO-2015182242 A1 * | 12/2015 .......... C10M 177/00 |

OTHER PUBLICATIONS

Extended European Search Report dated Jul. 3, 2018 in European Patent Application No. 16746690.3, 9 pages.
International Search Report dated Apr. 12, 2016 in PCT/JP2016/053363 filed Feb. 4, 2016.
Combined Office Action and Search Report dated Aug. 14, 2019 in Chinese Patent Application No. 201680008827.4, 19 pages (with unedited computer generated English translation and English translation of categories of cited documents).

* cited by examiner

GREASE AND METHOD FOR MANUFACTURING GREASE

CROSS-REFERENCE TO RELATED APPLICATIONS

This application is a National Stage of PCT/JP2016/053363, which was filed on Feb. 4, 2016. This application is based upon and claims the benefit of priority Japanese Application No. 2015-022709, which was filed on Feb. 6, 2015, and to Japanese Application No. 2015-021589, which was filed on Feb. 5, 2015, and to Japanese Application No. 2015-021587, which was filed on Feb. 5, 2015.

TECHNICAL FIELD

The present invention relates to a grease and a grease manufacturing method.

BACKGROUND ART

Inhomogeneous particles (so-called lump(s)) are mixed in a grease, especially in a diurea grease. The lump includes those supposedly derived from reaction products of isocyanate and amine, and foreign substances mixed during, for instance, a manufacturing process and/or storage. The lump herein also refers to both of those derived from the reaction products, and the foreign substances.

A typical manufacturing method of a urea grease includes: mixing a base oil with isocyanate to prepare a first solution, which is heated and stirred approximately at 60 degrees C.; mixing a base oil with amine to prepare a second solution kept at approximately 60 degrees C.; adding the second solution to the first solution while heating the first solution to approximately 60 degrees C. with stirring; heating the obtained mixture to approximately 160 degrees C.; and subsequently cooling the mixture to the room temperature. However, this method takes time in manufacturing (i.e., synthetic reaction) and is likely to generate the lump. Large lumps are known for deteriorating an acoustic property when the grease is used in a slide device such as a bearing. Further, since the thickener having a nonuniform structure formed of large lumps less contributes to an inherent performance of the grease, an efficiency of the thickener is decreased. In other words, a lot of thickener is required in order to obtain a predetermined hardness.

Accordingly, a grease manufacturing method for inhibiting formation of large lumps and improving an acoustic property has been proposed (see Patent Literatures 1 to 6).

CITATION LIST

Patent Literature(s)

Patent Literature 1: JP-2000-248290 A
Patent Literature 2: JP-03-190996 A
Patent Literature 3: JP-02-004895 A
Patent Literature 4: JP-2014-208851 A
Patent Literature 5: JP-2013-535545 A
Patent Literature 6: JP-2013-535546 A

SUMMARY OF THE INVENTION

Problems to be Solved by the Invention

In the manufacturing method of urea grease disclosed in Patent Literature 1, an amine solution is turned into droplets of 300 μm or less using a spray nozzle before being mixed with a solution of diphenyl methane-4,4'-diisocyanate (referred to as MDI hereinafter). However, such a process may entail dispersion of amine and/or MDI to possibly cause environmental pollution and/or chemical hazard. In addition, the method may produce droplets of nonuniform structures having a diameter of 300 μm or less, which may result in lumps of approximately several tens of micrometers.

The manufacturing method disclosed in Patent Literature 2 includes pressurizing an amine solution and an isocyanate solution using a pressurizing device to a predetermined pressure, and mixing the solutions by collisions with each other for reaction. However, such a process may also entail dispersion of amine and/or MDI to possibly cause environmental pollution and/or chemical hazard. In addition, the method may produce nonuniform structures smaller than a diameter of droplets, which may result in lumps of approximately several tens of micrometers.

In a manufacturing method of urea grease disclosed in Patent Literature 3, the lumps are dispersed using a mechanical means (e.g. a roll mill) while or after a thickener is formed. However, such a process requires time and effort. Further, since the lumps derived from reaction products of urea grease are hard and not easily dispersed, the size of the lumps are not sufficiently reduced.

In the manufacturing methods of urea grease disclosed in Patent Literatures 4 to 6, grease is manufactured by spraying and mixing materials at a high pressure. However, such methods require expensive facilities and are not sufficient in terms of size reduction of the lumps.

As discussed above, all of the manufacturing methods of urea grease disclosed in Patent Literatures 1 to 4 are insufficient in terms of size reduction of the lumps and are not capable of sufficiently improving the acoustic properties. In addition, an improvement in degree of centrifugal oil separation is also demanded of a urea grease in terms of long-term use.

An object of the invention is to provide a grease that is very excellent in acoustic properties and has improved degree of centrifugal oil separation, and a manufacturing method of the grease.

Means for Solving the Problems

A grease according to an aspect of the invention contains a base oil and a thickener, where A (unit: μm) representing a volumetric-based arithmetic mean particle size of particles comprised in the grease calculated using laser diffraction/scattering method satisfies a formula $A \leq 3$ (1).

A manufacturing method of a grease according to another aspect of the invention includes: applying a minimum shear rate of $10^2$ s$^{-1}$ or more to at least one of a first base oil including a first thickener precursor and a second base oil comprising a second thickener precursor; mixing the first base oil and the second base oil while keeping the minimum shear rate to prepare a mixture solution; and forming a thickener in the mixture solution.

A grease according to still another aspect of the invention includes a thickener, the thickener being formed by shearing a mixture solution of a monoamine compound, which is at least one of an aliphatic monoamine and an aromatic monoamine, and a diisocyanate compound at a minimum shear rate of $10^2$ s$^{-1}$ or more.

According to the above aspects of the invention, a grease that is very excellent in acoustic properties and has improved degree of centrifugal oil separation can be provided.

DESCRIPTION OF EMBODIMENT(S)

Figure 1:
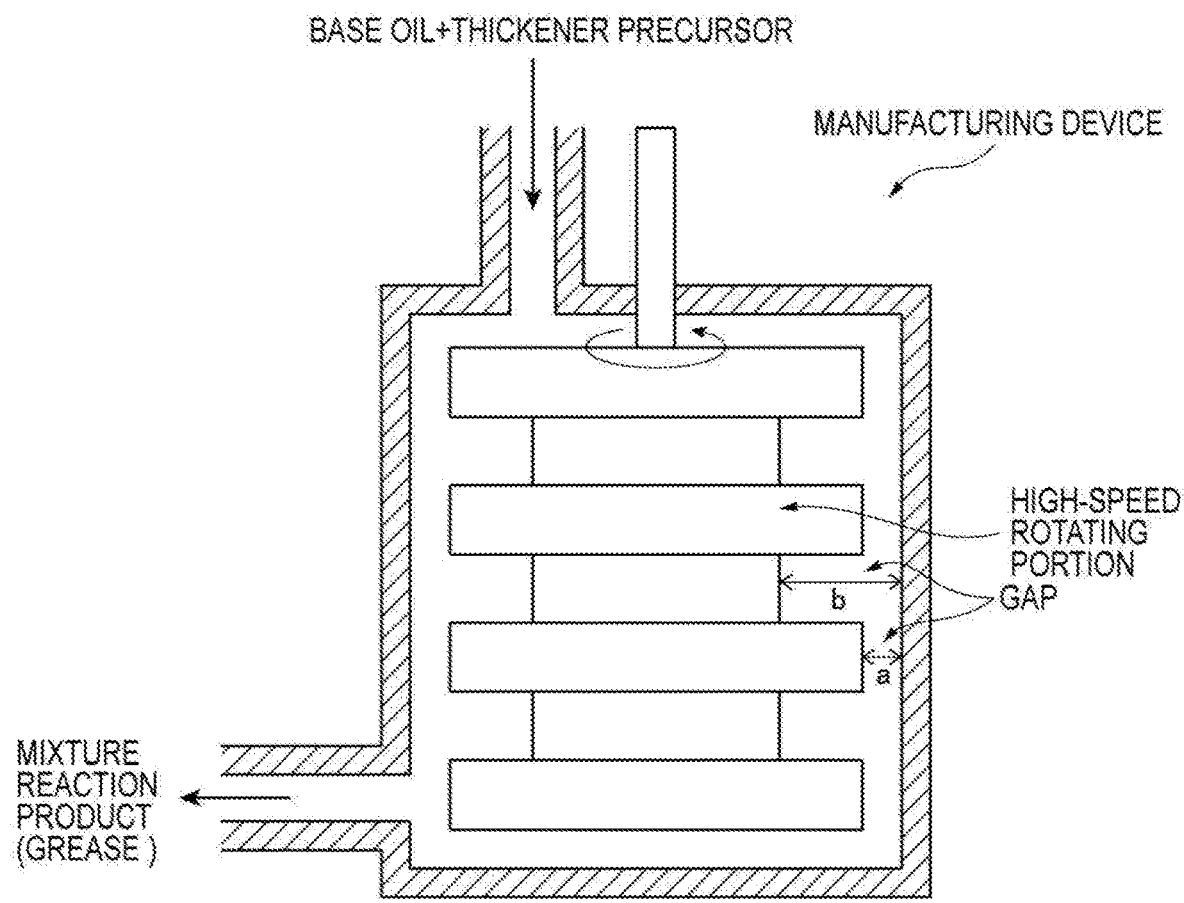
FIG. 1 is a schematic cross-sectional view showing a manufacturing method (manufacturing device) of a urea grease in a first exemplary embodiment of the invention.

Exemplary embodiment(s) of the invention will be described below with reference to the attached drawings.

First Exemplary Embodiment

The inventors have examined a volumetric-based arithmetic mean particle size of particles dispersed in a grease to find that the volumetric-based arithmetic mean particle size relates to the acoustic properties of the grease. The first exemplary embodiment has been achieved based on the above finding.

The grease of the first exemplary embodiment (sometime simply referred to as "the present grease" hereinafter) contains a base oil and a thickener, and satisfies the following formula (1), where A (unit: μm) is the volumetric-based arithmetic mean particle size of particles contained in the grease measured using laser diffraction/scattering method.

$$A \leq 3 \quad (1)$$

The present grease will be described below in detail.
Material for Manufacturing Grease
Base Oil The base oil used in manufacturing the present grease is not particularly limited, but may be any mineral base oil and synthetic base oil typically usable for manufacturing a grease. The mineral base oil and synthetic base oil may be used singularly or in combination. Water and/or organic acid may be added as necessary.

Usable mineral oils are obtained by purification in an appropriate combination of vacuum distillation, solvent deasphalting, solvent extraction, hydrocracking, solvent dewaxing, sulfate cleaning, clay purification, hydrorefining and the like. Examples of the synthetic base oil include polyalphaolefin (PAO) base oil, other hydrocarbon base oil, ester base oil, alkyldiphenylether base oil, polyalkylene glycol base oil (PAG), and alkylbenzene base oil. The base oil preferably has a kinematic viscosity at 40 degrees C. in a range from 10 $mm^2/s$ to 600 $mm^2/s$, more preferably from 20 $mm^2/s$ to 300 $mm^2/s$, further preferably from 30 $mm^2/s$ to 100 $mm^2/s$.
Thickener The thickener may be any of urea, a thickener for a simple soap grease, and a thickener for a complex grease.

Examples of the thickener for a simple soap grease or the thickener for a complex grease include a calcium soap, a lithium soap, a sodium soap, a calcium complex soap, a lithium complex soap, and calcium sulfonate complex soap.

Examples of precursors of the thickener for a urea grease include a monoamine and an isocyanate (diisocyanate). The monoamine may any of a single amine compound or a mixture of a plurality of amine compounds.

Examples of the monoamine include: an aromatic monoamine such as aniline, p-toluidine, and naphthyl amine; an aliphatic monoamine such as hexyl amine, cyclohexyl amine, octyl amine, dodecyl amine, hexadecyl amine, and eicosyl amine, Examples of isocyanate include diphenylmethane-4,4'-diisocyanate (MDI), tolylenediisocyanate, and naphthylene-1,5-diisocyanate.

A polyurea compound is obtainable by reacting, for instance, diisocyanate with monoamine or diamine. Examples of diisocyanate and monoamine used for forming the polyurea compound are the same as examples of diisocyanate and monoamine used for forming a diurea compound. Examples of diamine include ethylenediamine, propanediamine, butanediamine, hexandiamine, octanediamine, phenylenediamine, tolylenediamine, xylenediamine, and diaminodiphenylmethane.

One of the above amines may be used alone or a plurality of amines may be mixed in use. Similarly, one of the above isocyanates may be used alone or a plurality of isocyanates may be mixed in use.
Manufacturing Method of Grease The present grease can be obtained by performing a reaction for turning the thickener or a precursor of the thickener in the base oil into a grease while applying a high shear rate to the thickener or the precursor.

Figure 2:
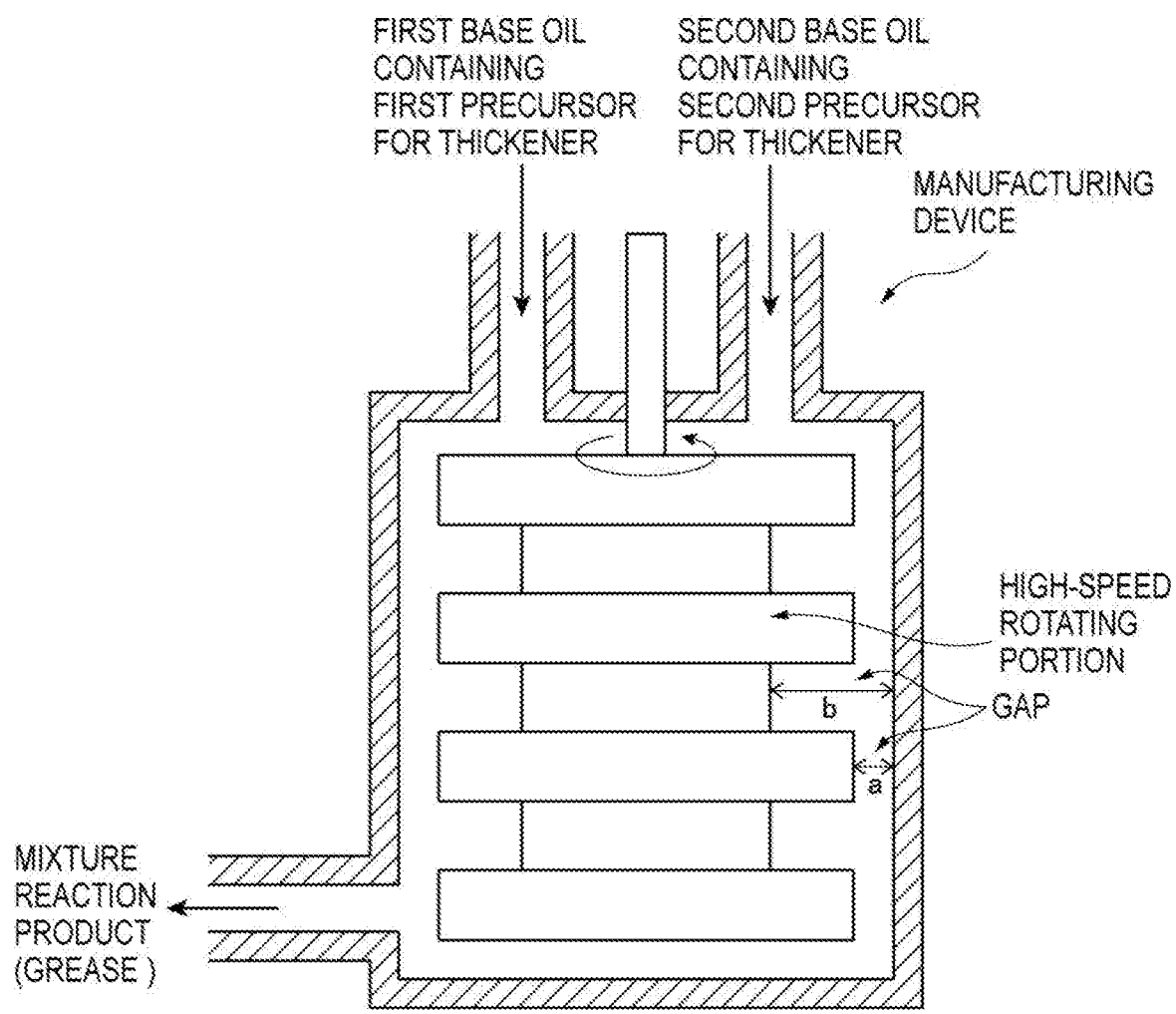
FIG. 2 is a schematic cross-sectional view showing a manufacturing method (manufacturing device) of a urea grease in the first exemplary embodiment and a third exemplary embodiment of the invention.
Figure 3:
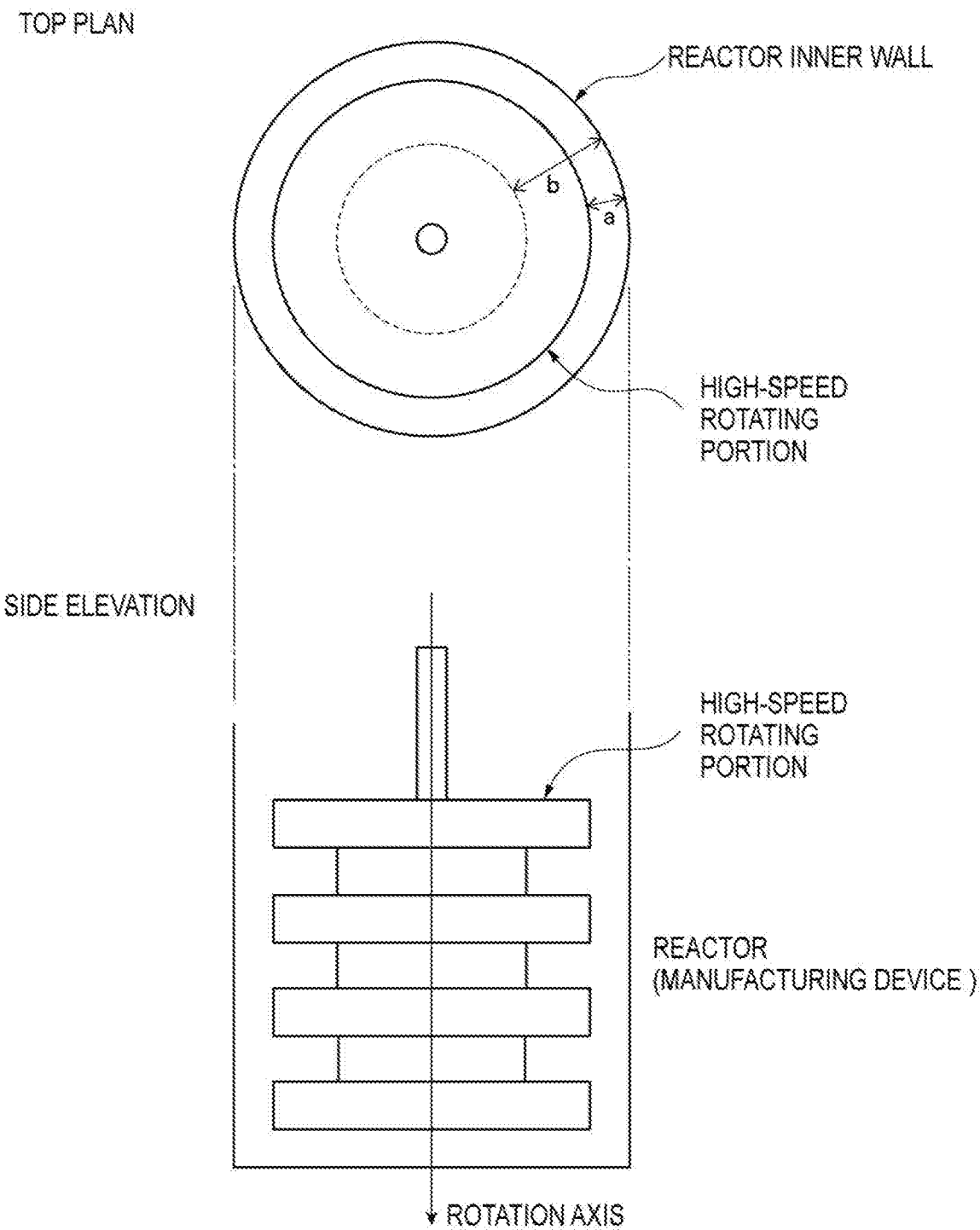
FIG. 3 schematically shows a lateral side and a top of the manufacturing devices shown in FIGS. 1 and 2.

A grease manufacturing device capable of generating such a high shear rate is exemplified by manufacturing devices structured as shown in FIG. 1 and FIG. 2. FIG. 3 schematically shows a lateral side and a top of the manufacturing devices in FIGS. 1 and 2. The manufacturing device shown in FIG. 1 is primarily suitable for manufacturing a soap grease, whereas the manufacturing device shown in FIG. 2 is suitable for manufacturing a urea grease.

The manufacturing devices shown in FIGS. 1 and 2 are configured to uniformly apply high-velocity shearing within an extremely short time. Further, the manufacturing device shown in FIG. 2 is configured to immediately apply a high shear to a mixture of a first base oil containing a first thickener precursor and a second base oil containing a second thickener precursor immediately after the first base oil and the second base oil are introduced into the manufacturing device or the first base oil and the second base oil are mixed. The high-velocity shearing is applied to the mixture by a gap (a, b) between a high-speed rotating portion and an inner wall of the machine. A diameter of the high-speed rotating portion may be constant (a=b) in an axial direction, or alternatively, the gap may be different. The gap may be adjusted by changing the diameter of the high-speed rotating portion in the axial direction, or alternatively, by providing the high-speed rotating portion in a form of a truncated cone and vertically moving the high-speed rotating portion with respect to an inner wall of a tapered reactor.

Further, the portions having a large gap may be provided by a screw or a spiral having continuous inclination, whereby extrusion capability may be provided to the high-speed rotating portion.

With the use of the manufacturing device shown in FIG. 1, the reaction for turning the mixture into a grease can be performed while applying a predetermined high shear rate to the mixture of the base oils containing a thickener precursor. With the use of the manufacturing device shown in FIG. 2, the first base oil containing the first thickener precursor and the second base oil containing the second thickener precursor can be mixed to obtain a mixture and the reaction for turning the mixture into a grease can be performed while applying a predetermined high shear rate to the mixture. When, for instance, a urea grease is to be manufactured, the first thickener precursor is an amine and the second thickener precursor is an isocyanate (diisocyanate).

In order to manufacture the present grease, it is preferable to apply to the above-described mixture a shear rate of $10^2$ $s^{-1}$ or more, more preferably $10^3$ $s^{-1}$ or more, further preferably $10^4$ $s^{-1}$ or more. A higher shear rate provides a more improved dispersion condition of the thickener or the precursor of the thickener, thereby providing a more uniform grease structure.

Considering safety of the device, heat generated by shearing and the like and removal of the heat, the shear rate applied to the above mixture is preferably $10^7$ $s^{-1}$ or less.

The above shear rate can be applied to the mixture, for instance, by introducing the mixture into a manufacturing device configured to cause shearing by a relative motion between facing wall surfaces as can be understood from FIGS. 1 and 2. It should be noted that the above-mentioned minimum shear rate is the same as a later-described minimum shear rate, which represents a shear rate applied to the mixture at a gap b in the reactor.

Figure 4:
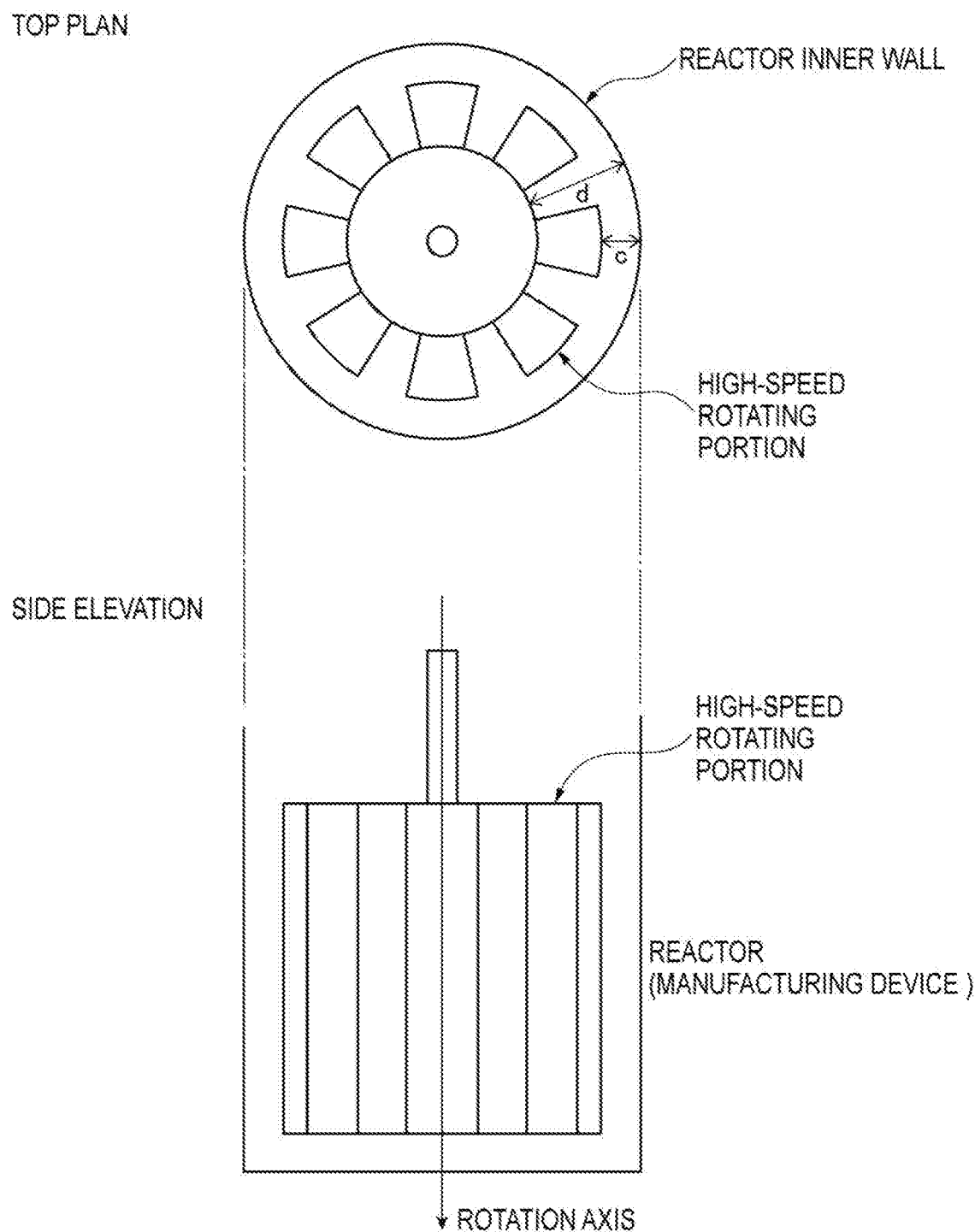
FIG. 4 is a schematic cross-sectional view showing a manufacturing method (manufacturing device) of a urea grease in another exemplary embodiment of the invention.

FIG. 4 shows a manufacturing device of a grease having a structure different from those shown in FIGS. 1 and 2, and the portions having different gaps (c, d) are disposed in a rotation direction. In this manufacturing device, the portions having a large gap may be inclined relative to an axis, whereby extrusion capability as provided by a screw may be provided to the high-speed rotating portion.

In the above manufacturing device, a ratio (Max/Min) of a maximum shear rate (Max) to the minimum shear rate (Min) is preferably 50 or less, more preferably 30 or less, further preferably 10 or less. When the shear rate applied to the mixture is as uniform as possible, the thickener or the precursor of the thickener are well dispersed to provide a uniform grease structure.

Herein, the maximum shear rate (Max) refers to a maximum shear rate applied to the mixture and the minimum shear rate (Min) refers to a minimum shear rate applied to the mixture. The maximum shear rate (Max) and the minimum shear rate (Min) are defined as follows, for instance, in the reactors shown in FIGS. 1 and 2.

Max=(a linear velocity of a surface of the high-speed rotating portion at the minimum gap between the surface of the high-speed rotating portion and an inner wall surface of the reactor/the gap)

Min=(a linear velocity of a surface of the high-speed rotating portion at the maximum gap between the surface of the high-speed rotating portion and the inner wall surface of the reactor/the gap)

In FIGS. 1 and 2, the gap used for calculating Max is a and the gap used for calculating Min is b.

Since a smaller Max/Min is preferable as described above, ideally a=b. In other words, in case of the reactors as shown in FIGS. 1 and 2, the high-speed rotating portion is most preferably a cylinder vertically having a uniform diameter.

The manufacturing method of the first exemplary embodiment is applicable to manufacture of all of the greases using a mixture solution containing a base oil and a thickener or a precursor of the thickener. Although a temperature condition in the manufacturing device differs depending on the thickener or the precursors to be used, the temperature approximately in a range from 40 degrees C. to 200 degrees C. is preferable when a diurea grease is manufactured. When the temperature is 200 degrees C. or less, the base oil is less likely to be degraded and the reaction is kept from becoming too fast to control. Further, when the temperature is 40 degrees C. or more, the precursor of the thickener (i.e. isocyanate or amine (e.g. stearyl amine)) is unlikely to be deposited from the base oil, which is preferable in terms of dispersibility and reaction rate.

Post-Process in Manufacturing Method of Grease

The present grease obtained by the above manufacturing method may be further kneaded. For this kneading, a roll mill generally used for manufacturing a grease is usable. The above grease may be introduced into the roll mill twice or more.

The grease obtained by the above manufacturing method may be further heated to the temperature in a range from 80 degrees C. to 200 degrees C. Further, for uniform heating, the grease may be kneaded and stirred. A furnace and the like may be used for heating.

Since the volumetric-based arithmetic mean particle size (A) of particles dispersed in the present grease satisfies the relationship of the above formula (1) (3 μm or less), the present grease is more excellent in acoustic properties than a grease manufactured by a typical method using the same materials (base oil, thickener, the amount of the thickener). In order to achieve the advantages of the invention, the volumetric-based arithmetic mean particle size (A) is preferably 2.6 μm or less, more preferably 2 μm or less, further preferably 1.6 μm or less, most preferably 1 μm or less. It should be noted that the condition of the formula (1) can be satisfied by increasing the minimum shear rate applied to the mixture base oil in the grease manufacturing device.

The volumetric-based arithmetic mean particle size of the particles dispersed in the grease can be easily measured using a commercially available laser diffraction/scattering distribution measurement machine. For instance, the volumetric-based arithmetic mean particle size can be suitably measured by Partica LA-950V2 manufactured by HORIBA, Ltd. using both of 405 nm and 650 nm wavelengths.

Since the present grease is extremely excellent in acoustic properties, the present grease is suitable to a slide component such as a bearing.

Examples of the above-mentioned acoustic properties include Peak High32-64s and Level High32-64s according to FAG method. The details of the evaluation of the acoustic properties by the FAG method will be described later in Examples.

Additive

Various additives may be further added to the grease obtained by the present manufacturing method as long as the addition of the additives does not impair an advantage of the invention. Examples of the additives include an antioxidant, extreme pressure agent, and rust inhibitor.

Examples of the antioxidant include: an amine antioxidant such as alkylated diphenylamine, phenyl-α-naphthylamine and alkylated-α-naphthylamine; and a phenol antioxidant such as 2,6-di-t-butyl-4-methylphenol and 4,4-methylenebis (2,6-di-t-butylphenol). A content of the antioxidant is preferably approximately in a range from 0.05 mass % to 5 mass % based on a total amount of the grease.

Examples of the extreme pressure agent are thiocarbamates such as zinc dialkyldithiophosphate, molybdenum dialkyldithiophosphate, ashless dithiocarbamate, zinc dithiocarbamate and molybdenum dithiocarbamate, sulfur compound (sulfurized fat and oil, sulfurized olefin, polysulfide, sulfurized mineral oil, thiophosphates, thioterpenes and dialkylthiodipropionates), phosphates and phosphites (tricresyl phosphate and triphenyl phosphite). A content of the extreme pressure agent is preferably approximately in a range from 0.1 mass % to 5 mass % based on the total amount of the grease.

Examples of the rust inhibitor include benzotriazole, zinc stearate, succinate, succinic acid derivative, thiadiazole, benzotriazole, benzotriazole derivative, sodium nitrite, petroleum sulfonate, sorbitan monooleate, fatty acid soap and amine compound. A content of the rust inhibitor is preferably approximately in a range from 0.01 mass % to 10 mass % based on the total amount of the grease.

Second Exemplary Embodiment

In the description of the second exemplary embodiment, the components identical with those of the first exemplary embodiment, for instance, will be designated by the same name to omit or simplify the explanation thereof.

The inventors found that urea molecules and a bundle (fiber structure) were formed within an extremely short time after an isocyanate solution and an amine solution were mixed. The inventors estimated that a nonuniform structure such as a thick bundle and a large lump was formed because a low shear rate was non-uniformly applied when the isocyanate solution and the amine solution are mixed in a typical manufacturing method. The inventors focused attention on this point and found that the size of the lump could be made smaller than one formed in the typical manufacturing method by applying high-velocity shear to one of the isocyanate solution and the amine solution, subsequently mixing the other of the isocyanate solution and the amine solution and turning the mixture solution into a grease while uniformly applying a high shear rate to the mixture of above two solutions. It was also found that the grease obtained by the above method exhibited very excellent acoustic properties (e.g. those measured by BeQuiet method). The second exemplary embodiment has been achieved based on the above findings.

The second exemplary embodiment will be described below.

In a grease manufacturing method according to the second exemplary embodiment (hereinafter also referred to as "the present manufacturing method"), a minimum shear rate of $10^2$ $s^{-1}$ or more is applied to at least one of a first base oil containing a first thickener precursor and a second base oil containing a second thickener precursor, the first base oil and the second base oil are mixed to prepare a mixture while keeping the minimum shear rate, and a thickener is formed in the mixture.

Further, in the second exemplary embodiment, it is preferable that, in a single reactor, a minimum shear rate of $10^2$ $s^{-1}$ or more is applied to the first base oil containing the first thickener precursor, a minimum shear rate of $10^2$ $s^{-1}$ or more is applied to the second base oil containing the second thickener precursor, the first base oil and the second base oil are mixed to prepare a mixture while keeping the minimum shear rate for the first base oil and the minimum shear rate for the second base oil, and a thickener is formed in the mixture. Alternatively, it is also preferable that a minimum shear rate of $10^2$ $s^{-1}$ or more is applied to the first base oil containing the first thickener precursor, the second base oil containing the second thickener precursor is added to the first base oil to prepare a mixture while keeping the minimum shear rate, and the thickener is formed in the mixture.

In any of the above modes, the first thickener precursor and the second thickener precursor are reacted to form the thickener while a high shear rate is kept applied to the mixture (mixture base oil) to restrain the lump from being generated. The present manufacturing method will be described below in detail.

Material for Manufacturing Grease
Base Oil

The first base oil and the second base oil used in the present manufacturing method may be the same as the mineral base oil and synthetic base oil used in the first exemplary embodiment.

Considering compatibility of the first base oil and the second base oil, the first base oil and the second base oil preferably have similar polar characteristics and similar viscosity characteristics. Accordingly, the first base oil and the second base oil are most preferably the same base oil in use.

Thickener

In the second exemplary embodiment, a thickener is formed from two types of thickener precursors. The thickener precursors are not particularly limited. When the thickener is urea, the thickener precursors are monoamine and isocyanate (diisocyanate). It should be noted that the monoamine, polyurea compound and isocyanate may be the same as those in the first exemplary embodiment.

The above isocyanate and monoamine are sequentially introduced at a molar ratio of 1:2 into a reactor (a grease manufacturing device) and are immediately subjected to high shear as described later to be mixed and reacted with each other, so that a diurea grease that is less likely to generate large lumps can be manufactured.

Manufacturing Method of Grease

In the present manufacturing method, a minimum shear rate of $10^2$ $s^{-1}$ or more is applied to at least one of the first base oil containing the first thickener precursor and the second base oil containing the second thickener precursor, the first base oil and the second base oil are mixed to prepare a mixture while keeping the minimum shear rate, and a thickener is formed in the mixture.

Further, it is also possible that, in a single reactor, a minimum shear rate of $10^2$ $s^{-1}$ or more is applied to the first base oil containing the first thickener precursor, a minimum shear rate of $10^2$ $s^{-1}$ or more is applied to the second base oil containing the second thickener precursor, the first base oil and the second base oil are mixed to prepare a mixture while keeping the minimum shear rate for the first base oil and the minimum shear rate for the second base oil, and a thickener is formed in the mixture. Alternatively, after a minimum shear rate of $10^2$ $s^{-1}$ or more is applied to the first base oil containing the first thickener precursor, the second base oil containing the second thickener precursor may be added to the first base oil to prepare a mixture while keeping the above minimum shear rate. Then, the first base oil and the second base oil are mixed and dispersed, causing a reaction to form the thickener, and to form a grease.

In other words, it is extremely important in any of the above instances that the first base oil and the second base oil are mixed while the minimum shear rate of at least one of the first base oil and the second base oil is kept at $10^2$ $s^{-1}$ or more. When the first base oil and the second base oil are mixed under a predetermined high-speed shear, the lumps can be restrained from being generated and grown.

The above-described minimum shear rate is $10^2$ $s^{-1}$ or more, preferably $10^3$ $s^{-1}$ or more, more preferably $10^4$ $s^{-1}$ or more. A higher minimum shear rate provides a more improved dispersion condition of the thickener precursors 1 and 2 and the generated thickener, thereby providing a more uniform grease structure. In other words, the molecules of the thickener do not form a thick bundle and a large lump.

Considering safety of the device, heat generated by shearing and the like and removal of the heat, the minimum shear rate is preferably $10^7$ s$^{-1}$ or less.

The above high shear rate can be applied to the mixture, for instance, by introducing the mixture into a reactor configured to cause shear by a relative motion between facing wall surfaces. It should be noted that the minimum shear rate is the same as later-described minimum shear rate, which represents a shear rate applied to the mixture at a gap b in the reactor.

In the present manufacturing method, it is preferable that a time in which the shear rate of the mixture is kept at $10^2$ s$^{-1}$ or more (residence time at a high shear zone) is 0.002 seconds or more, more preferably in a range from 0.02 seconds to 100 seconds, further preferably in a range from 0.2 seconds to 10 seconds. When the residence time at a high shear zone is 0.002 seconds or more, the thickener better disperses. Further, when the residence time at a high shear zone is 100 seconds or less, the size of the device per manufactured amount of the grease can be more easily reduced.

It should be noted that the residence time at a high shear zone(s) can be defined as follows.

Residence time at a high shear zone(s)=volume of the high shear portion (mL)/{flow rate of the first base oil (mL/s)+flow rate of the second base oil (mL/s)}

Figure 6:
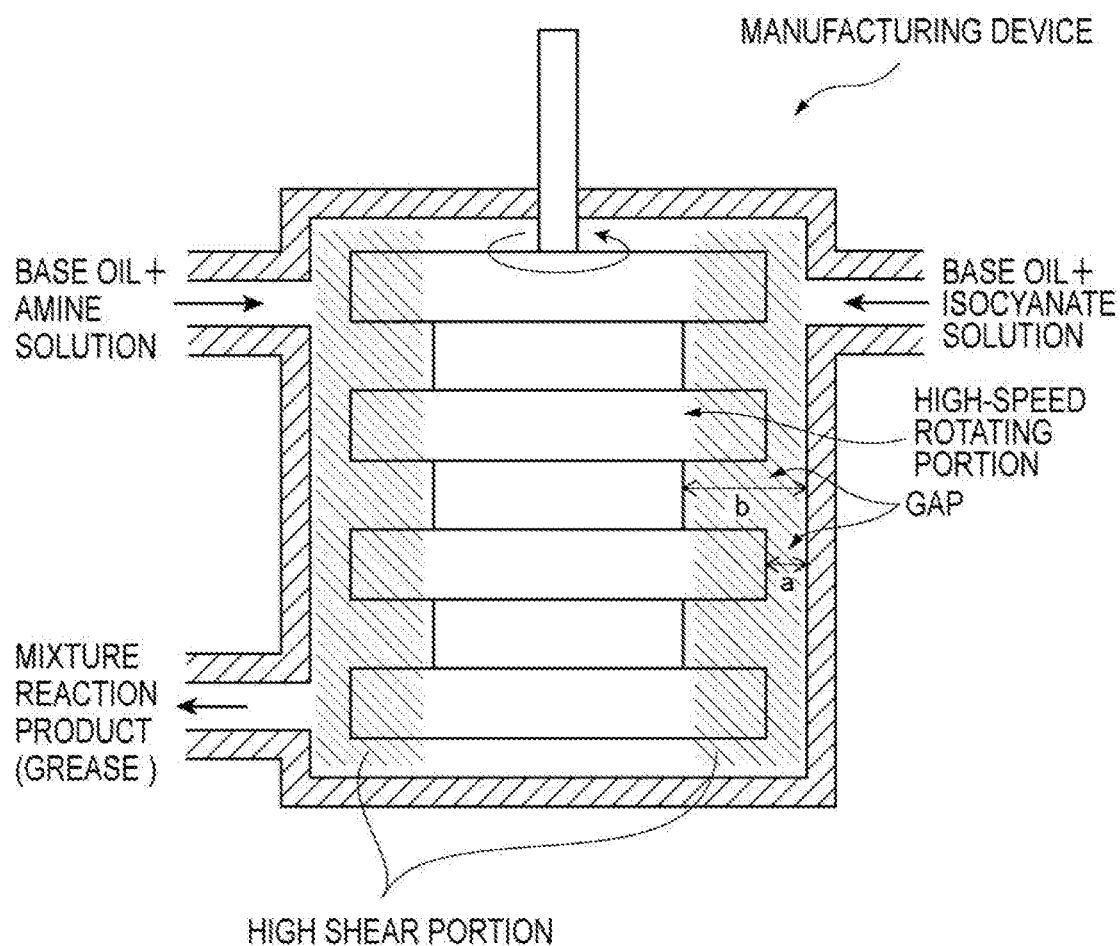
FIG. 6 is a schematic cross-sectional view showing an example of a manufacturing method (manufacturing device) of a urea grease in a second exemplary embodiment of the invention.

A grease manufacturing device (the reactor) capable of generating such a high shear rate is exemplified by a manufacturing device structured as shown in FIG. 6.

The manufacturing device shown in FIG. 6 is configured to mix the second base oil after the first base oil is kept at a predetermined minimum shear rate, and to apply and keep a high-velocity shearing to the mixture. The high-velocity shearing is applied to the mixture by a gap (a, b) between a high-speed rotating portion and an inner wall of the reactor. A diameter of the high-speed rotating portion may be constant (a=b) in an axial direction, or alternatively, the gap may be different. The gap may be adjusted by changing the diameter of the high-speed rotating portion in the axial direction, or alternatively, by providing the high-speed rotating portion in a form of a truncated cone and vertically moving the high-speed rotating portion with respect to an inner wall of a tapered reactor.

Further, the portions having a large gap may be provided by a screw or a spiral having continuous inclination, whereby extrusion capability may be provided to the high-speed rotating portion.

The present manufacturing method is applicable to all grease manufacturing methods including mixing a solution of the first base oil and the first thickener precursor with a solution of the second base oil and the second thickener precursor. Although a temperature condition for manufacturing the thickener differs depending on the precursors to be used, the temperature approximately in a range from 50 degrees C. to 200 degrees C. is preferable when manufacturing urea as the thickener. When the temperature is equal to or more than 50 degrees C., isocyanate is likely to be solved in the base oil. When the temperature is equal to or less than 200 degrees C., deterioration of the base oil can be sufficiently inhibited. A temperature of a solution of the base oil and amine before being introduced into the reactor is preferably approximately in a range from 50 degrees C. to 100 degrees C.

Post-Process in Manufacturing Method of Grease

In the present manufacturing method, the grease obtained by the above manufacturing method may be further kneaded. For this kneading, a roll mill generally used for manufacturing a grease is usable. The above grease may be introduced into the roll mill twice or more.

In the present manufacturing method, the grease obtained by the above manufacturing method may be further heated in order to control the consistency. The temperature for the heating is preferably in a range from 80 degrees C. to 200 degrees C., more preferably in a range from 100 degrees C. to 180 degrees C., further preferably in a range from 130 degrees C. to 170 degrees C. Further, for uniform heating, the grease may be kneaded and stirred. A furnace and the like may be used for heating.

The grease obtained by the present manufacturing method is very excellent in acoustic properties. For instance, it is possible to obtain a grease of GN class of 4 in a test using BeQuiet grease noise tester manufactured by Svenska Kullagerfabriken AB in Sweden.

Additive

Various additives may be further added to the grease obtained by the present manufacturing method. Examples of the additives include those mentioned in the first exemplary embodiment. A content of the antioxidant in the present manufacturing method is preferably approximately in a range from 0.05 mass % to 2 mass % based on a total amount of the grease.

The additives in the present manufacturing method may be contained singly or in combination of several kinds thereof.

Third Exemplary Embodiment

In the description of the third exemplary embodiment, the components identical with those of the first and second exemplary embodiments will be designated by the same name to omit or simplify the explanation thereof.

Urea Grease

A urea grease (sometimes referred to as "the present grease" hereinafter) according to the third exemplary embodiment is prepared by shearing a mixture containing a monoamine compound, which is at least one of an aliphatic monoamine and an aromatic monoamine, and a diisocyanate compound at a shear rate of $10^2$ s$^{-1}$ or more to cause a reaction. The present grease will be described below in detail.

The mixture of the monoamine compound, which is at least one of the aliphatic monoamine and the aromatic monoamine, and the diisocyanate compound is prepared by putting a solution containing the monoamine compound in a base oil and a solution containing the diisocyanate compound in a base oil into a reactor.

The present grease is a urea grease whose thickener is obtained through a reaction of the above mixture while applying the minimum shear rate of $10^2$ s$^{-1}$ or more.

The present grease will be described below in detail.

Base Oil

The base oil used in the present grease may be the same as the mineral base oil and synthetic base oil used in the first and second exemplary embodiments.

Thickener

The thickener used in the present grease is obtained by reacting the monoamine compound, which is at least one of aliphatic monoamine and aromatic monoamine, and the diisocyanate compound in the solution. In order to enhance both of the acoustic properties and lubrication lifetime, it is necessary in the third exemplary embodiment that a minimum shear rate of $10^2$ s$^{-1}$ or more is applied to the above mixture in the reaction.

The aliphatic monoamine is not limited to specific types of aliphatic monoamine but may be a chain aliphatic monoamine or alicyclic monoamine. However, in terms of acoustic properties, it is preferable that the aliphatic monoamine is a chain aliphatic monoamine. It is preferable for the chain aliphatic monoamine to have 6 to 24 carbon atoms in terms of boiling point and solubility, more preferably 6 to 20 carbon atoms, particularly preferably 8 to 18 carbon atoms. Examples of the chain aliphatic monoamine include hexyl amine, octyl amine, dodecyl amine, hexadecyl amine, stearyl amine and eicosyl amine. One of the chain aliphatic monoamines may be used alone or a plurality of the chain aliphatic monoamines may be mixed in use.

Examples of the aromatic monoamine include tolyl amine, aniline and trimethylaniline. One of the aromatic monoamines may be used alone or a plurality of the aromatic monoamines may be mixed in use. Among the above, tolyl amine is preferable in terms of stability and safety.

Examples of the diisocyanate compound include diphenylmethane-4,4'-diisocyanate (MDI), tolylene diisocyanate, and naphthylene-1,5-diisocyanate. One of the diisocyanates may be used alone or a plurality of diisocyanates may be mixed in use.

Measurement Value by FAG Method

The measurement value of the present grease by FAG method preferably satisfies the requirement below.

Specifically, when the present grease is obtained through a process in which the minimum shear rate of $10^2$ s$^{-1}$ or more is applied to the mixture for reaction, a ratio of a value ($V_S$) representing measurements of Level High32-64s of the present grease according to the FAG method to a value ($V_N$) representing measurements of Level High32-64s of a urea grease prepared by a typical method preferably satisfies the following requirement represented by the following formula.

$$V_S/V_N \leq 0.9$$

It should be noted that the urea grease prepared according to a typical method is, for instance, exemplified by the urea greases as defined in the following (i) and (ii).
(i) A urea grease obtained by shearing the mixture at a minimum shear rate of less than $10^2$ s$^{-1}$ to cause a reaction.
(ii) A urea grease obtained through a reaction in which a ratio (Max/Min) of a maximum shear rate (Max) to a minimum shear rate (Min) applied to the mixture is controlled to be 70 or more.

The maximum shear rate (Max) and the minimum shear rate (Min) will be described later.

The Peak High32-64s and Level High32-64s according to the FAG method can be measured using an acoustic measurement device dedicated for a grease ("Grease Test Rig Be Quiet+" manufactured by Svenska Kullagerfabriken AB). Specifically, a bearing dedicated for an acoustic measurement, in which a grease is not put, is set in the acoustic measurement device. While the bearing is being rotated at a predetermined speed, acoustic data is obtained after an elapse from 32 seconds to 64 seconds since the bearing starts rotating. The above operations are repeated for six times in total without exchanging the bearing. Additionally, a predetermined amount of sample (grease) is sealed in the bearing, and, while the bearing is being rotated at a predetermined speed, acoustic data is obtained after the elapse from 32 seconds to 64 seconds since the bearing starts rotating. The above operations are repeated for six times in total without exchanging the bearing. The acoustic data is analyzed using a program installed in the acoustic measurement device to obtain an average of the six measurements of the Peak High and Level High.

The same operations (six operations with no grease and six operations after filling the grease) are performed on another dedicated bearing and the results are similarly analyzed using the program to obtain an average. The averages measured for the two bearings are averaged to obtain the values of the Peak High and the Level High according to the FAG method.

Usually, after a grease is filled in a bearing, the acoustic properties are evaluated based on acoustic data obtained after the elapse from 32 seconds to 64 seconds from the start of the first rotation in the FAG method. An acoustic peak is sometimes observed due to rupture of air bubbles supposed to be contained in the grease after the elapse from 32 seconds to 64 seconds from the start of the first rotation. However, the evaluation on the acoustic properties is unduly downgraded when the acoustic peak supposed to be derived from the rupture of air bubbles is observed in a grease that has inherently excellent acoustic properties. Highly reproducible results of the acoustic properties often cannot be obtained even after 3 to 5 repetitions of the measurements. Accordingly, in order to overcome the above deficiencies, six measurements are performed for one dedicated bearing in the exemplary embodiment. The peak supposed to be derived from the rupture of air bubbles decreases after the second rotation and thus highly reproducible data can be obtained with the use of the average of the six measurements.

A method for providing the Peak High32-64s and Level High32-64s obtainable by the FAG method in the above-described range is exemplified by a later-described manufacturing method of the present grease under a uniform high shear.

Additive

Various additives may be further added to the present grease. Examples of the additives include those mentioned in the first and second exemplary embodiments. A content of the antioxidant in the present grease is preferably approximately in a range from 0.05 mass % to 5 mass % based on a total amount of the grease. The additives of the present grease may be contained singly or in combination of several kinds thereof.

Manufacturing Method of Grease

The present grease can be manufactured, for instance, by a later-described manufacturing method of the present grease (hereinafter, also referred to as "the present manufacturing method"). In the present manufacturing method, the first base oil containing the monoamine compound and the second base oil containing the diisocyanate compound are mixed to prepare a mixture and a minimum shear rate of $10^2$ s$^{-1}$ or more is applied to the mixture. In other words, immediately after the first base oil and the second base oil are put into a reactor, high-velocity shearing is applied to the mixture. Subsequently, the monoamine compound and the diisocyanate compound are mixed and dispersed to react with each other, thereby forming a thickener. The present manufacturing method will be described below in detail.

Base Oil

The first base oil and the second base oil usable in the present manufacturing method are not particularly limited, but may be any base oils usable in the present grease.

Considering compatibility of the first base oil and the second base oil, the first base oil and the second base oil preferably have similar polar characteristics and similar viscosity characteristics. Accordingly, the first base oil and the second base oil are most preferably the same base oil in use.

Thickener

In the present manufacturing method, the thickener is formed from the monoamine compound and the diisocyanate compound.

As the monoamine compound and the diisocyanate compound, the examples of those usable in the present grease are usable.

The diisocyanate compound and the monoamine compound are continuously introduced at a molar ratio of 1:2 into a reactor (a grease manufacturing device) and are immediately subjected to a high shear as described later to be mixed and reacted with each other, so that a diurea grease that is less likely to generate large lumps can be manufactured. Moreover, the above-described mixture of the diisocyanate compound and the monoamine compound is continuously introduced at equivalent amounts of an isocyanate group and an amino group into a reactor (a grease manufacturing device) and are similarly subjected to a high shear to be mixed and reacted with each other, so that a urea grease that is less likely to generate large lumps can be manufactured.

Manufacturing Method of Grease

In the present manufacturing method, the first base oil containing the monoamine compound and the second base oil containing the diisocyanate compound are mixed to prepare a mixture and a minimum shear rate of $10^2$ s$^{-1}$ or more is applied to the mixture. In other words, in order to inhibit formation or growth of the lumps, it is crucial to apply a high-velocity shear to the mixture within the shortest time as possible after the first base oil and the second base oil are put into the reactor.

Specifically, a time elapsed before applying the above shear rate after putting the first base oil and the second base oil in the reactor is preferably 15 minutes or less, more preferably 5 minutes or less, further preferably 10 seconds or less. Since a reaction starts after the diisocyanate compound and the monoamine compound are well mixed and dispersed, when the elapsed time is shorter, molecules of the thickener are less likely to form a thick bundle and a large lump.

The minimum shear rate applied to the above mixture is $10^2$ s$^{-1}$ or more as described above, preferably $10^3$ s$^{-1}$ or more, more preferably $10^4$ s$^{-1}$ or more. A higher shear rate provides a more improved dispersion condition of the diisocyanate compound and the monoamine compound and the formed thickener, thereby providing a more uniform grease structure. In other words, the molecules of the thickener do not form a thick bundle and a large lump.

Considering safety of the device, heat generated by shear and the like and removal of the heat, the minimum shear rate applied to the above mixture is preferably $10^7$ s$^{-1}$ or less.

The above shear rate can be applied to the mixture, for instance, by introducing the mixture into a reactor configured to cause shear by a relative motion between facing wall surfaces.

A grease manufacturing device (the reactor) capable of generating such a high shear rate is exemplified by the above-described manufacturing device structured as shown in FIG. 2 of the first exemplary embodiment.

In case of the reactor as shown in FIG. 2, the high-speed rotating portion in a form of a cylinder vertically having a uniform diameter exhibits the smallest ratio (Max/Min).

Figure 5:
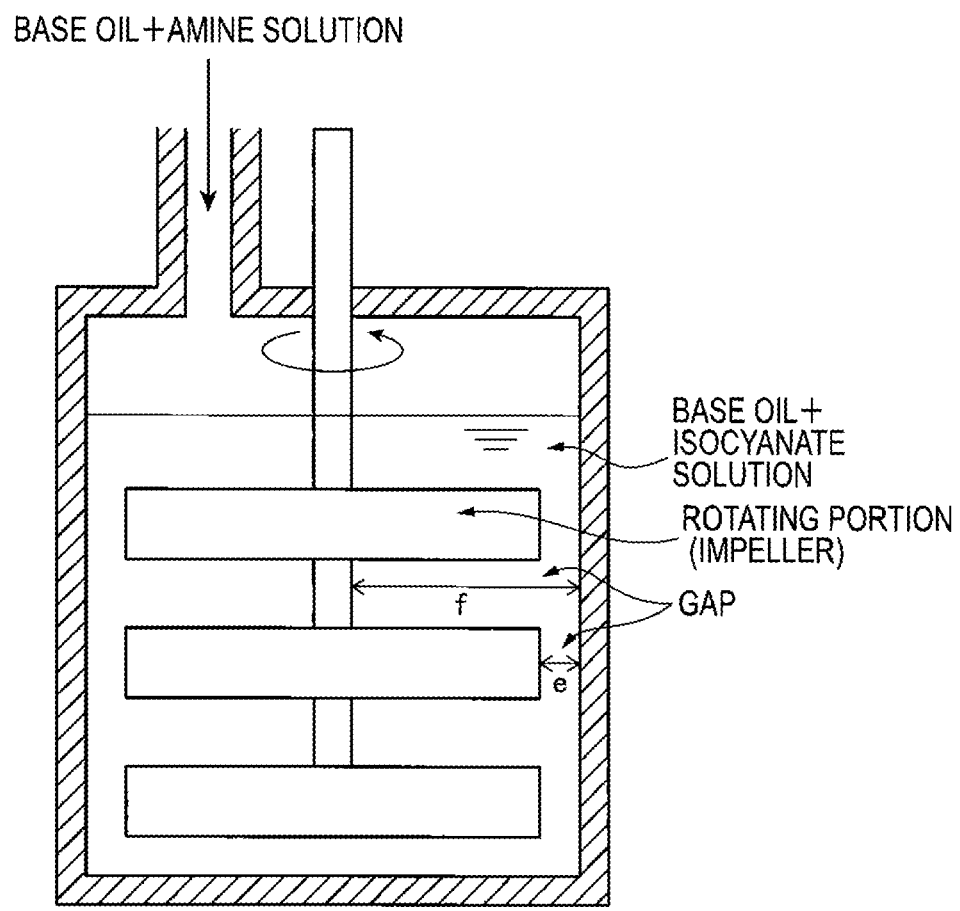
FIG. 5 schematically shows a typical manufacturing method of a urea grease.

In contrast, in a typical reactor having the high-speed rotating portion in a form of a disk or a propeller (impeller) as shown in FIG. 5, a gap in the calculation of Max is e and a gap in the calculation of Min is f. Since the value of the gap f is large, the value of Min becomes as small as $10^2$ s$^{-1}$ or less. In other words, the above-mentioned urea grease, which is obtained by applying a minimum shear rate of less than $10^2$ s$^{-1}$ to the mixture for reaction, is identical to one obtained in a reaction in the typical reactor whose high-speed rotating portion is in a form of a disk or a propeller.

Further, the value of the ratio (Max/Min) becomes as large as 70 or more. In other words, the above-mentioned urea grease, which is obtained through a reaction in which the ratio (Max/Min) is controlled to be 70 or more, is identical to one obtained in a reaction in the typical reactor whose high-speed rotating portion is in a form of a disk or a propeller.

Accordingly, in the present manufacturing method, the ratio (Max/Min) of the maximum shear rate (Max) to the minimum shear rate (Min) applied to the mixture in the reactor is preferably 50 or less, more preferably 20 or less, further preferably 10 or less, particularly preferably 5 or less. When the shear rate applied to the mixture is as uniform as possible, a grease having a uniform structure without having grown lumps is provided.

When the manufacturing device manufactures a urea grease, the manufacturing device may have a structure as shown in FIG. 4.

The present manufacturing method is applicable to all grease manufacturing methods including putting a solution of the first base oil and the monoamine compound and a solution of the second base oil and the diisocyanate compound into a reactor. Although a temperature condition for manufacturing the thickener differs depending on the precursors to be used, the temperature approximately in a range from 50 degrees C. to 200 degrees C. is preferable when manufacturing urea as the thickener. When the temperature is equal to or more than 50 degrees C., isocyanate is likely to be solved in the base oil. When the temperature is equal to or less than 200 degrees C., deterioration of the base oil can be sufficiently inhibited. A temperature of the solution of the base oil and amine before being introduced into the reactor is preferably in a range approximately from 50 degrees C. to 100 degrees C., more preferably in a range approximately from 60 degrees C. to 90 degrees C.

Post-Process in Manufacturing Method of Urea Grease

In the present manufacturing method, the grease obtained by the above manufacturing method may be further kneaded. For this kneading, a roll mill generally used for manufacturing a grease is usable. The above grease may be introduced into the roll mill twice or more.

In the present manufacturing method, the grease obtained by the above manufacturing method may be further heated to the temperature in a range from 70 degrees C. to 250 degrees C. It should be noted that a heating temperature of 250 degrees C. or more is likely to cause deterioration of the base oil. A heating time at this time is preferably in a range from thirty minutes to two hours. Further, for uniform heating, the grease may be kneaded and stirred. A furnace and the like may be used for heating.

EXAMPLE(S)

The invention will be described in further detail with reference to Examples and Comparatives, but the description is mere illustrative and not exhaustive of the invention.

Specifically, a grease was manufactured under the following various conditions and properties of the obtained grease were evaluated.

Example 1A

A grease was manufactured using a grease manufacturing device as shown in FIG. 2. The manufacturing method was specifically performed as follows.

A 500N mineral oil (having a kinematic viscosity at 40 degrees C. of 90 mm$^2$/s and containing MDI of 11.0 mass %) heated at 70 degrees C. and a 500N mineral oil (having a kinematic viscosity at 40 degrees C. of 90 mm$^2$/s and containing octyl amine of 11.1 mass % and cyclohexylamine of 2.13 mass %) heated at 70 degrees C. were continuously introduced at respective flow rates of 258 mL/min and 214 mL/min into a manufacturing device. Immediately after the introduction, a minimum shear rate of 10,200 s$^{-1}$ was applied to the obtained mixture solution by a high-speed rotating portion when the mixture solution passed a gap. A ratio (Max/Min) of the maximum shear rate (Max) to the minimum shear rate (Min) was 1.03. A time elapsed before applying the maximum shear rate to the mixture after mixing the above two solutions was approximately three seconds.

The grease discharged from the manufacturing device was put into a container preheated at 60 degrees C. While being stirred at 250 rpm, the grease was immediately heated up to 120 degrees C., kept at 120 degrees C. for 30 minutes, further heated up to 160 degrees C. and was kept at 160 degrees C. for one hour. Subsequently, the mixture was left to be cooled while being kept stirred. The obtained grease was kneaded twice using a roll mill and properties of the grease were evaluated according to the methods described later. The results are shown in Table 1.

Comparative 1A

A grease was manufactured by a typical method. Specifically, a 500N mineral oil (having a kinematic viscosity at 40 degrees C. of 90 mm$^2$/s and containing octyl amine of 10.9 mass % and cyclohexyl amine of 2.11 mass %) kept at 60 degrees C. was dropped into a 500N mineral oil (having a kinematic viscosity at 40 degrees C. of 90 mm$^2$/s and containing MDI of 11.2 mass %) kept at 60 degrees C. and stirred by an impeller. After the amine solution was dropped therein, the mixture was heated to 160 degrees C. with stirring and kept at 160 degrees C. for one hour. Subsequently, the grease was left to be cooled while being kept stirred, and the obtained grease was kneaded by a roll mill twice. The obtained grease was evaluated in the same manner as in Example 1A. The results are shown in Table 1.

Example 2A

A grease was manufactured in the same manner as in Example 1A except that a PAO base oil (having a kinematic viscosity at 40 degrees C. of 63 mm$^2$/s and containing MDI of 6.09 mass %) heated at 70 degrees C. and a PAO base oil (having a kinematic viscosity at 40 degrees C. of 63 mm$^2$/s and containing stearyl amine of 4.78 mass % and cyclohexylamine of 7.03 mass %) also heated at 70 degrees C. were continuously introduced at respective flow rates of 880 mL/min and 474 mL/min into a manufacturing device. The minimum shear rate (Min) was 10,200 s$^{-1}$. The ratio (Max/Min) of the maximum shear rate (Max) to the minimum shear rate (Min) was 1.03. The obtained grease was evaluated in the same manner as in Example 1A. The results are shown in Table 1.

Comparative 2A

A grease was manufactured in the same manner as in Comparative 1A except that a PAO base oil (having a kinematic viscosity at 40 degrees C. of 63 mm$^2$/s and containing cyclohexyl amine of 6.19 mass % and stearyl amine 4.21 mass %) kept at 60 degrees C. was dropped into a PAO base oil (having a kinematic viscosity at 40 degrees C. of 63 mm$^2$/s and containing MDI of 6.57 mass %/o) kept at 60 degrees C. The obtained grease was evaluated in the same manner as in Example 1A. The results are shown in Table 1.

Example 3A

A grease was manufactured in the same manner as in Example 1A except that a 500N mineral oil (having a kinematic viscosity at 40 degrees C. of 90 mm$^2$/s and containing MDI of 6.76 mass %) heated at 70 degrees C. and a 500N mineral oil (having a kinematic viscosity at 40 degrees C. of 90 mm$^2$/s and containing cyclohexylamine of 10.3 mass %) also heated at 70 degrees C. were continuously introduced at respective flow rates of 325 mL/min and 175 mL/min into a manufacturing device, and, immediately after the introduction, a minimum shear rate of 210,000 s$^{-1}$ was applied to the obtained mixture solution by a high-speed rotating portion when the mixture solution passed a gap. A ratio (Max/Min) of the maximum shear rate (Max) to the minimum shear rate (Min) was 1.03. The obtained grease was evaluated in the same manner as in Example 1A. The results are shown in Table 1.

Comparative 3A

A grease was manufactured in the same manner as in Comparative 1A except that a 500N mineral oil (having a kinematic viscosity at 40 degrees C. of 90 mm$^2$/s and containing cyclohexyl amine of 9.06 mass %) kept at 60 degrees C. was dropped into a 500N mineral oil (having a kinematic viscosity at 40 degrees C. of 90 mm$^2$/s and containing MDI of 7.35 mass %) kept at 60 degrees C. The obtained grease was evaluated in the same manner as in Example 1A. The results are shown in Table 1.

Example 4A

A grease was manufactured in the same manner as in Example 1A except that a PAO base oil (having a kinematic viscosity at 40 degrees C. of 63 mm$^2$/s and containing MDI of 6.98 mass %) heated at 70 degrees C. and a PAO base oil (having a kinematic viscosity at 40 degrees C. of 63 mm$^2$/s and containing octyl amine of 18.4 mass %) also heated at 70 degrees C. were continuously introduced at respective flow rates of 325 mL/min and 120 mL/min into a manufacturing device, and, immediately after the introduction, a minimum shear rate of 210,000 s$^{-1}$ was applied to the obtained mixture solution by a high-speed rotating portion when the mixture solution passed a gap. A ratio (Max/Min) of the maximum shear rate (Max) to the minimum shear rate (Min) was 1.03. The obtained grease was evaluated in the same manner as in Example 1A. The results are shown in Table 1.

Comparative 4A

A grease was manufactured in the same manner as in Comparative 1A except that a PAO base oil (having a kinematic viscosity at 40 degrees C. of 63 mm$^2$/s and containing octyl amine of 12.4 mass %) kept at 60 degrees C. was dropped into a PAO base oil (having a kinematic viscosity at 40 degrees C. of 63 mm$^2$/s and containing MDI of 9.09 mass %) kept at 60 degrees C. The obtained grease was evaluated in the same manner as in Example 1A. The results are shown in Table 1.

Example 5A

A grease was manufactured in the same manner as in Example 1A except that a 500N mineral oil (having a kinematic viscosity at 40 degrees C. of 90 mm$^2$/s and containing MDI of 7.49 mass %) heated at 70 degrees C. and a 500N mineral oil (having a kinematic viscosity at 40 degrees C. of 90 mm$^2$/s and containing octyl amine of 14.7 mass %) also heated at 70 degrees C. were continuously introduced at respective flow rates of 300 mL/min and 204 mL/min into a manufacturing device and a minimum shear rate of 20,400 s$^{-1}$ was applied to the obtained mixture solution. A ratio (Max/Min) of the maximum shear rate (Max) to the minimum shear rate (Min) was 1.03. The obtained grease was evaluated in the same manner as in Example 1A. The results are shown in Table 1.

Comparative 5A

A grease was manufactured in the same manner as in Comparative 1A except that a 500N mineral oil (having a kinematic viscosity at 40 degrees C. of 90 mm$^2$/s and containing octyl amine of 12.4 mass %) kept at 60 degrees C. was dropped into a 500N mineral oil (having a kinematic viscosity at 40 degrees C. of 90 mm$^2$/s and containing MDI of 9.09 mass %) kept at 60 degrees C. The obtained grease was evaluated in the same manner as in Example 1A. The results are shown in Table 1.

Example 6A

A grease was manufactured in the same manner as in Example 1A except that a PAO base oil (having a kinematic viscosity at 40 degrees C. of 63 mm$^2$/s and containing MDI of 8.96 mass %) heated at 70 degrees C. and a PAO base oil (having a kinematic viscosity at 40 degrees C. of 63 mm$^2$/s and containing cyclohexyl amine of 23.8 mass %) heated at 70 degrees C. were continuously introduced at respective flow rates of 325 mL/min and 92 mL/min into a manufacturing device, a minimum shear rate of 210,000 s$^{-1}$ was applied to the obtained mixture solution immediately after the introduction by a high-speed rotating portion when the mixture solution passed a gap, and the grease discharged from the manufacturing device was introduced twice into a roll mill. A ratio (Max/Min) of the maximum shear rate (Max) to the minimum shear rate (Min) was 1.03. The obtained grease was evaluated in the same manner as in Example 1A. The results are shown in Table 1.

Comparative 6A

A grease was manufactured in the same manner as in Comparative 1A except that a PAO base oil (having a kinematic viscosity at 40 degrees C. of 63 mm$^2$/s and containing cyclohexyl amine of 10.2 mass %) kept at 60 degrees C. was dropped into a PAO base oil (having a kinematic viscosity at 40 degrees C. of 63 mm$^2$/s and containing MDI of 13.3 mass %) kept at 60 degrees C. The obtained grease was evaluated in the same manner as in Example 1A. The results are shown in Table 1. It should be noted that the volumetric-based arithmetic mean particle size could not be accurately measured by a laser diffraction/scattering method due to an influence of multiple scattering. However, it is clear that the volumetric-based arithmetic mean particle size exceeds 3 μm.

Example 7A

A grease was manufactured in the same manner as in Example 1A except that a PAO base oil (having a kinematic viscosity at 40 degrees C. of 63 mm$^2$/s and containing MDI of 6.03 mass %) heated at 70 degrees C. and a PAO base oil (having a kinematic viscosity at 40 degrees C. of 63 mm$^2$/s and containing cyclohexyl amine of 3.35 mass % and stearyl amine of 13.7 mass %) also heated at 70 degrees C. were continuously introduced at respective flow rates of 303 mL/min and 170 mL/min into a manufacturing device, and, immediately after the introduction, a minimum shear rate of 210,000 s$^{-1}$ was applied to the obtained mixture solution by a high-speed rotating portion when the mixture solution passed a gap. A ratio (Max/Min) of the maximum shear rate (Max) to the minimum shear rate (Min) was 1.03. The obtained grease was evaluated in the same manner as in Example 1A. The results are shown in Table 1.

Comparative 7A

A grease was manufactured in the same manner as in Comparative 1A except that a PAO base oil (having a kinematic viscosity at 40 degrees C. of 63 mm$^2$/s and containing cyclohexyl amine of 2.59 mass % and stearyl amine of 10.5 mass %) kept at 60 degrees C. was dropped into a PAO base oil (having a kinematic viscosity at 40 degrees C. of 63 mm$^2$/s and containing MDI of 7.25 mass %) kept at 60 degrees C. The obtained grease was evaluated in the same manner as in Example 1A. The results are shown in Table 1.

TABLE 1

| | Basic Properties | | Degree of Centrifugal Oil Separation (mass %) | Shearing Conditions | | | Light Diffusion Properties Arithmetic Mean | Acoustic properties | |
|---|---|---|---|---|---|---|---|---|---|
| | Amount of Thickener (mass %) | Worked Penetration | | Max ($s^{-1}$) | Min ($s^{-1}$) | Max/Min (—) | Particle Size (A) (μm) | Peak High | Level High |
| Ex. 1A | 12 | 264 | 4.3 | 10,500 | 10,200 | 1.03 | 0.29 | 0.81 | 8.05 |
| Comp. 1A | 12 | 281 | 5.5 | Approx. 100 | 1.23 | 81 | 3.79 | 1.05 | 8.49 |
| Ex. 2A | 8 | 233 | 1.6 | 10,500 | 10,200 | 1.03 | 2.96 | 0.58 | 6.22 |
| Comp. 2A | 8 | 233 | 2.2 | Approx. 100 | 1.23 | 81 | 11.5 | 1.24 | 6.66 |
| Ex. 3A | 8 | 314 | 5.3 | 216,000 | 210,000 | 1.03 | 0.20 | 1.87 | 7.46 |
| Comp. 3A | 8 | 344 | 29.3 | Approx. 100 | 1.23 | 81 | 15.6 | 4.58 | 18.2 |
| Ex. 4A | 10 | 321 | 7.6 | 216,000 | 210,000 | 1.03 | 0.21 | 0.57 | 6.25 |
| Comp. 4A | 10 | 248 | 10.1 | Approx. 100 | 1.23 | 81 | 4.30 | 0.57 | 7.25 |
| Ex. 5A | 10 | 254 | 6.0 | 21,000 | 20,400 | 1.03 | 0.15 | 0.60 | 7.26 |

TABLE 1-continued

|  | Basic Properties | | | Shearing Conditions | | | Light Diffusion | Acoustic properties | |
| --- | --- | --- | --- | --- | --- | --- | --- | --- | --- |
|  | Amount of | | Degree of Centrifugal Oil | Maximum Shear Rate | Minimum Shear Rate |  | Properties Arithmetic Mean | | |
|  | Thickener (mass %) | Worked Penetration | Separation (mass %) | Max ($s^{-1}$) | Min ($s^{-1}$) | Max/Min (—) | Particle Size (A) (μm) | Peak High | Level High |
| Comp. 5A | 10 | 236 | 6.8 | Approx. 100 | 1.23 | 81 | 8.07 | 0.72 | 8.17 |
| Ex. 6A | 12 | 240 | 2.7 | 216,000 | 210,000 | 1.03 | 1.60 | 2.65 | 14.4 |
| Comp. 6A | 12 | 245 | 6.0 | Approx. 100 | 1.23 | 81 | multiple scattering | 20.6 | 90.2 |
| Ex. 7A | 10 | 221 | 0.5 | 216,000 | 210,00 | 1.03 | 2.60 | 0.49 | 6.21 |
| Comp. 7A | 10 | 238 | 1.5 | Approx. 100 | 1.23 | 81 | 28.7 | 1.98 | 10.4 |

Evaluation Method of Grease
(1) Amount of Thickener

The grease was filtrated using a membrane filter (HAWP04700 manufactured by Millipore Corp.) to separate the grease into the base oil and the thickener, and the mass of each of the base oil and the thickener was measured to calculate the amount (mass %) of the thickener in the grease.

(2) Worked Penetration

The worked penetration was measured according to JIS K 22205.3.

(3) Degree of Centrifugal Oil Separation 20 g of a sample (grease) was put into a centrifugal separation tube of a centrifugal separator and a degree of centrifugal oil separation when 16,000 G of acceleration was applied to the sample for three hours at 20 degrees C. was calculated according to the following formula.

Degree of centrifugal oil separation (mass %)=(mass of separated oil/mass of loaded grease)×100

(4) Arithmetic Mean Particle Size

A laser diffraction/scattering particle-size distribution measuring machine (Partica LA-950V2 manufactured by HORIBA, Ltd., measurable particle size: 10 nm to 1 μm (at wavelength 405 nm), 100 nm to 3 mm (at wavelength 650 nm)) was used to measure a volumetric-based arithmetic mean particle size of particles dispersed in a grease. Specifically, in order to eliminate the influence of air bubbles, a grease, which was deaerated using a planetary stirring deaerator (MAZERUSTAR type KK-V300SS-I manufactured by KURABO INDUSTRIES LTD.) was applied on and held in a paste cell (LY-9504 manufactured by HORIBA, Ltd.) to be measured. The volumetric-based arithmetic mean particle size was measured, after the thickness (sample thickness) of the grease in the paste cell was adjusted so that transmissivity of the sample fell to an appropriate value (i.e. in a range from 70% to 90%), using the above-mentioned laser diffraction/scattering particle-size distribution measuring machine at wavelengths of 405 nm and 650 nm.

It should be noted that, in the measurement of the arithmetic mean particle size, transmissivity of less than 70% even with a reduced sample thickness was evaluated as multiple scattering.

(5) Acoustic Properties

Peak High32-64s and Level High32-64s were measured using an acoustic measurement device dedicated for a grease ("Grease Test Rig Be Quiet+" manufactured by Svenska Kullagerfabriken AB). Specifically, a bearing dedicated for an acoustic measurement, in which a grease was not put, was set in the acoustic measurement device. While the bearing was being rotated at a predetermined speed, acoustic data was obtained after the elapse from 32 seconds to 64 seconds since the bearing started rotating. Further, a predetermined amount of a sample (grease) was put in the bearing. While the bearing was being rotated at a predetermined speed, acoustic data was obtained after the elapse from 32 seconds to 64 seconds since the bearing started rotating. The acoustic data was analyzed by a program stored in the acoustic measurement device, so that a Peak High value and a Level High value were obtained.

Evaluation Results

The materials (base oil, thickener, amount of thickener) of the greases of Examples 1A to 7A are the same as those of the grease of corresponding Comparatives 1A to 7A respectively. It is understandable that the greases of Examples 1A to 7A, all of which possess the features of the invention, exhibit considerably excellent acoustic properties than the greases of corresponding Comparatives 1A to 7A.

Next, a urea grease was manufactured under the following various conditions and acoustic properties of the obtained grease were evaluated.

Example 1B

A grease was manufactured using a reactor (high-dispersion manufacturing device) shown in FIG. 6.

While a first base oil (PAO: kinematic viscosity at 40 degrees C. of 47 $mm^2/s$) containing 6.03 mass % of MDI (diphenyl methane-4,4'-diisocyanate) and heated to 70 degrees C. was continuously introduced into the reactor at a flow rate of 5.0 mL/s, a second base oil (PAO: kinematic viscosity at 40 degrees C. of 47 $mm^2/s$) containing 3.35 mass % of cyclohexylamine and 13.68 mass % of stearyl amine and also heated to 70 degrees C. was continuously introduced into a high shear portion in the reactor at a flow rate of 2.9 mL/s. The maximum shear rate was 33,000 $s^{-1}$, and the minimum shear rate was 6,600 $s^{-1}$. A ratio (Max/Min) of the maximum shear rate (Max) to the minimum shear rate (Min) was 5. A residence time of the mixture at a high shear zone was 0.25 seconds.

The grease discharged from the reactor was put into a container preheated at 90 degrees C. The grease was heated up to 160 degrees C. over a period of approximately 30 minutes, and was kept at 160 degrees C. for one hour. Subsequently, the mixture was left to be cooled while being kept stirred. An amount of the thickener in the manufactured grease was approximately 10 mass %. After the obtained grease was stirred and deaerated using a planetary stirring deaerator (MAZERUSTAR type KK-V300SS-I manufactured by KURABO INDUSTRIES LTD.), the worked penetration (JIS K 2220) of the obtained grease was measured and acoustic measurement using BeQuiet method was performed. The results are shown in Table 2.

Example 2B

A grease was manufactured using the same reactor as one in Example 1B.

While a first base oil (PAO: kinematic viscosity at 40 degrees C. of 47 mm$^2$/s) containing 7.70 mass % of MDI (diphenyl methane-4,4'-diisocyanate) and heated to 70 degrees C. was continuously introduced into the reactor at a flow rate of 4.0 mL/s, a second base oil (PAO: kinematic viscosity at 40 degrees C. of 47 mm$^2$/s) containing 2.42 mass % of cyclohexylamine and 9.89 mass % of stearyl amine and also heated to 70 degrees C. was continuously introduced into a high shear portion in the reactor at a flow rate of 4.1 mL/s. The maximum shear rate was 11,000 s$^{-1}$, and the minimum shear rate was 5,600 s$^{-1}$. The ratio (Max/Min) of the maximum shear rate (Max) to the minimum shear rate (Min) was 2.0. The residence time of the mixture at a high shear zone was 0.20 seconds.

The grease discharged from the reactor was put into a container preheated at 90 degrees C. The grease was heated up to 160 degrees C. over approximately 30 minutes, and was kept at 160 degrees C. for one hour. Subsequently, the mixture was cooled while being kept stirred. An amount of the thickener in the manufactured grease was approximately 10 mass %. The obtained grease was evaluated in the same manner as in Example 1B. The results are shown in Table 2.

Comparative 1B

A grease was manufactured according to a typical method using the reactor shown in FIG. 5.

While being stirred, the second base oil (having a kinematic viscosity at 40 degrees C. of 47 mm$^2$/s and containing cyclohexyl amine of 2.59 mass % and stearyl amine 10.05 mass %) kept at 60 degrees C. was dropped into the first base oil (having a kinematic viscosity at 40 degrees C. of 47 mm$^2$/s and containing MDI of 7.25 mass %) kept at 60 degrees C. The maximum shear rate was approximately 100 s$^{-1}$, and the minimum shear rate was 1.23 s$^{-1}$. A ratio (Max/Min) of the maximum shear rate (Max) to the minimum shear rate (Min) was approximately 81.

After the amine solution was dropped therein, the mixture was heated to 160 degrees C. with stirring and kept at 160 degrees C. for one hour. Subsequently, the mixture was cooled with stirring An amount of the thickener in the manufactured grease was approximately 10 mass %. The obtained grease was evaluated in the same manner as in Example 1B. The results are shown in Table 2.

by the manufacturing method of the second exemplary embodiment are classified in GN class 4 according to BeQuiet method, showing extremely excellent acoustic properties.

In contrast, the urea grease manufactured in Comparative 1B by a typical method is inferior in the acoustic properties according to the BeQuiet method.

Next, a urea grease was manufactured under the following various conditions and properties of the obtained grease were evaluated.

Example 1C

A grease was manufactured using the urea grease manufacturing device as shown in FIG. 2. The manufacturing method was specifically performed as follows.

A PAO base oil (having a kinematic viscosity at 40 degrees C. of 63 mm$^2$/s and containing MDI of 6.98 mass %) heated at 70 degrees C. and a PAO base oil (having a kinematic viscosity at 40 degrees C. of 63 mm$^2$/s and containing octyl amine of 18.4 mass %) also heated at 70 degrees C. were continuously introduced at respective flow rates of 325 mL/min and 120 mL/min into a manufacturing device. Immediately after the introduction, a maximum shear rate of 216,000 s$^{-1}$ was applied to the obtained mixture by a high-speed rotating portion when the mixture passed a gap. The minimum shear rate (Min) when the mixture passed the gap was 210,000 s$^{-1}$. The ratio (Max/Min) of the maximum shear rate (Max) to the minimum shear rate (Min) when the mixture passed the gap was 1.03. A time elapsed before applying the maximum shear rate to the mixture after mixing the above two solutions was approximately three seconds. The grease discharged from the manufacturing device was put into a container preheated at 60 degrees C. While being stirred at 250 rpm, the grease was immediately heated up to 120 degrees C., kept at 120 degrees for 30 minutes and further heated up to and kept at 160 degrees C. for one hour. Subsequently, the grease was left to be cooled while being kept stirred, and introduced into a roll mill twice to obtain a grease. An amount of the thickener in the obtained grease was 10 mass % based on the total amount of the grease.

Comparative 1C

A urea grease was manufactured by a typical method. Specifically, a PAO base oil (having a kinematic viscosity at 40 degrees C. of 63 mm$^2$/s and containing octyl amine of 12.4 mass %) kept at 60 degrees C. was dropped into a PAO base oil (having a kinematic viscosity at 40 degrees C. of 63 mm$^2$/s and containing MDI of 9.09 mass %) kept at 60 degrees C. and stirred by an impeller. After the amine

TABLE 2

|  | Amine Molar Ratio[1] | Thickener (mass %) | Maximum Shear Rate Max (s$^{-1}$) | Minimum Shear Rate Min (s$^{-1}$) | Max/Min (—) | Worked Penetration | BeQuiet Method (GN Class) |
|---|---|---|---|---|---|---|---|
| Ex. 1B | Cy:C18 = 4:6 | 10 | 33,000 | 6,600 | 5 | 243 | 4 |
| Ex. 2B | Cy:C18 = 4:6 | 10 | 11,000 | 5,000 | 2 | 220 | 4 |
| Comp. 1B | Cy:C18 = 4:6 | 10 | Approx. 100 | 1.23 | 81 | 190 | 1 |

[1]Cy: cyclohexylamine, C18: stearyl amine

Evaluation Results

According to the results shown in Table 2, it is understood that all of the urea greases obtained in Examples 1B and 2B solution was dropped therein, the mixture was heated to 160 degrees C. with stirring and kept at 160 degrees C. for one hour. Subsequently, the grease was left to be cooled while being kept stirred, and introduced into a roll mill twice to obtain a grease. An amount of the thickener in the obtained grease was 10 mass % based on the total amount of the grease.

The maximum shear rate (Max) and minimum shear rate (Min) during manufacturing of each of the greases were respectively 100 s$^{-1}$ and 1.23 s$^{-1}$. The ratio (Max/Min) of the maximum shear rate (Max) to the minimum shear rate (Min) when the mixture passed the gap was 81.

Example 2C

A grease was manufactured in the same manner as in Example 1C except that a 500N mineral oil (having a kinematic viscosity at 40 degrees C. of 90 mm$^2$/s and containing MDI of 7.49 mass %) heated at 70 degrees C. and a 500N mineral oil (having a kinematic viscosity at 40 degrees C. of 90 mm$^2$/s and containing octyl amine of 14.7 mass %) also heated at 70 degrees C. were continuously introduced at respective flow rates of 300 mL/min and 204 mL/min into the manufacturing device and a maximum shear rate of 21,000 s$^{-1}$ was applied to the obtained mixture solution. An amount of the thickener in the obtained grease was 10 mass % based on the total amount of the grease.

The minimum shear rate (Min) when the mixture passed the gap was 20,400 s$^{-1}$. The ratio (Max/Min) of the maximum shear rate (Max) to the minimum shear rate (Min) when the mixture passed the gap was 1.03.

Comparative 2C

A grease was obtained in the same manner as in Comparative 1C except that the base oil was changed to a 500N mineral oil (having a kinematic viscosity at 40 degrees C. of 90 mm$^2$/s). An amount of the thickener in the obtained grease was 10 mass % based on the total amount of the grease.

The maximum shear rate (Max) and minimum shear rate (Min) during manufacturing of each of the greases were respectively 100 s$^{-1}$ and 1.23 s$^{-1}$. The ratio (Max/Min) of the maximum shear rate (Max) to the minimum shear rate (Min) when the mixture passed the gap was 81.

Example 3C

A grease was obtained in the same manner as in Example 1C except that an ester synthetic oil (having a kinematic viscosity at 40 degrees C. of 33 mm/s and containing MDI of 10.9 mass %) heated at 70 degrees C. and an ester synthetic oil (having a kinematic viscosity at 40 degrees C. of 33 mm$^2$/s and containing tolyl amine of 28.9 mass %) also heated at 70 degrees C. were continuously introduced at respective flow rates of 325 mL/min and 100 mL/min into a manufacturing device. An amount of the thickener in the obtained grease was 15 mass % based on the total amount of the grease.

The minimum shear rate (Min) when the mixture passed the gap was 21,000 s$^{-1}$. The ratio (Max/Min) of the maximum shear rate (Max) to the minimum shear rate (Min) when the mixture passed the gap was 1.03.

Comparative 3C

A grease was obtained in the same manner as in Comparative 1C except that an ester synthetic oil (having a kinematic viscosity at 40 degrees C. of 33 mm$^2$/s and containing tolyl amine of 15.9 mass %) kept at 60 degrees C. was dropped into an ester synthetic oil (having a kinematic viscosity at 40 degrees C. of 33 mm$^2$/s and containing MDI of 14.3 mass %) kept at 60 degrees C. An amount of the thickener in the obtained grease was 15 mass % based on the total amount of the grease.

The maximum shear rate (Max) and minimum shear rate (Min) during manufacturing of each of the greases were respectively 100 s$^{-1}$ and 1.23 s$^{-1}$. The ratio (Max/Min) of the maximum shear rate (Max) to the minimum shear rate (Min) when the mixture passed the gap was 81.

Evaluation of Grease

The grease was evaluated by the methods below in terms of a worked penetration, degree of centrifugal oil separation, Peak High32-64s, and Level High32-64s. The obtained results are shown in Table 3. The maximum shear rate, the ratio (Max/Min) of the maximum shear rate (Max) to the minimum shear rate (Min) and the amount of the thickener in manufacturing each of the greases are also shown in Table 3.

(1) Worked Penetration

The worked penetration was measured by a method defined according to JIS K2220.

(2) Degree of Centrifugal Oil Separation

A sample of 20 g of grease was put into a centrifugal separation tube of a centrifugal separator and a degree of centrifugal oil separation when 16,000 G of acceleration was applied to the sample for three hours at 20 degrees C. was calculated according to the following formula.

Degree of centrifugal oil separation (wt %)=(weight of separated oil/weight of loaded grease)×100

(3) Peak High32-64s and Level High32-64s

Peak High32-64s and Level High32-64s are measurable using a grease-dedicated acoustic measurement device (Grease Test Rig Be Quiet+) manufactured by Svenska Kullagerfabriken AB. Specifically, a bearing dedicated for an acoustic measurement, in which a grease is not put, is set in the acoustic measurement device. While the bearing is being rotated at a predetermined speed, acoustic data is obtained after the elapse from 32 seconds to 64 seconds since the bearing starts rotating. The above operations are repeated for six times in total without exchanging the bearing. Additionally, a predetermined amount of sample (grease) is sealed in the bearing, and, while the bearing is being rotated at a predetermined speed, acoustic data is obtained after the elapse from 32 seconds to 64 seconds since the bearing starts rotating. The above operations are repeated for six times in total without exchanging the bearing. The acoustic data is analyzed using a program installed in the acoustic measurement device to obtain the values of the Peak High and Level High.

The same operations (six operations with no grease and six operations after filling the grease) are performed on another dedicated bearing and the results are similarly analyzed using the program to obtain values of the Peak High and Level High.

Each of the two sets of the values of the Peak High and Level High for the two bearings is averaged to obtain an average thereof.

TABLE 3

| | Maximum Shear Rate Max ($s^{-1}$) | Minimum Shear Rate Min ($s^{-1}$) | Ratio of Maximum Shear Rate to Minimum Shear Rate Max/Min (—) | Amount of Thickener (mass %) | Worked Penetration | $V_S/V_N$ (—) | Degree of Centrifugal Oil Separation (mass %) | Peak High 32-64 s | Level High 32-64 s |
|---|---|---|---|---|---|---|---|---|---|
| Ex. 1C | 216,000 | 210,000 | 1.03 | 10 | 321 | 0.86 | 7.6 | 0.57 | 6.25 |
| Comp. 1C | 100 | 1.23 | 81 | 10 | 248 | — | 10.1 | 0.57 | 7.25 |
| Ex. 2C | 21,000 | 20,400 | 1.03 | 10 | 254 | 0.89 | 6.0 | 0.60 | 7.26 |
| Comp. 2C | 100 | 1.23 | 81 | 10 | 236 | — | 6.8 | 0.72 | 8.17 |
| Ex. 3C | 216,000 | 210,000 | 1.03 | 15 | 341 | 0.76 | 17.1 | 2.63 | 10.30 |
| Comp. 3C | 100 | 1.23 | 81 | 15 | 353 | — | 32.9 | 4.23 | 13.50 |

As shown in Table 3, a ratio ($V_S/V_N$) of a value $V_S$ of the Level High32-64s in Example 1C to a value $V_N$ of the Level High32-64s in Comparative 1C is calculated as 0.86. Similarly, the ratio ($V_S/N_N$) in Example 2C and Comparative 2C is calculated as 0.89 and the ratio ($V_S/V_N$) in Example 3C and Comparative 3C is calculated as 0.76. In other words, all of the urea greases of Examples 1C to 3C show the ratio ($V_S/V_N$) of 0.9 or less.

When comparing Examples 1C to 3C respectively to Comparatives 1C to 3C, it is understood that the urea greases of Examples 1C to 3C have improved acoustic properties and improved degree of centrifugal oil separation in spite of the use of the same type and amount of the base oil and thickener.

The invention claimed is:

1. A grease, comprising:
   a base oil; and
   a thickener comprising a urea,
   wherein:
   A (unit: μm) representing a volumetric-based arithmetic mean particle size of particles of the urea comprised in the grease calculated using laser diffraction/scattering method satisfies a formula (1):

$$A \leq 1.6 \qquad (1).$$

2. The grease according to claim 1, wherein the thickener comprises a polyurea compound.

3. The grease according to claim 1, wherein:
   the thickener is a urea;
   the urea is a reaction product of a monoamine and a diisocyanate; and
   the monoamine is composed of a single amine compound or is a mixture of a plurality of amine compounds.

4. The grease according to claim 1, wherein the grease is prepared by mixing the thickener or a precursor of the thickener in the base oil to provide a mixture solution, and applying a minimum shear rate of $10^2$ $s^{-1}$ or more to the mixture solution.

5. The grease according to claim 1, wherein the grease is prepared by mixing a first base oil comprising a first thickener precursor and a second base oil comprising a second thickener precursor to prepare a mixture solution, and applying a minimum shear rate of $10^2$ $s^{-1}$ or more to the mixture solution.

6. A manufacturing method of a grease, the method comprising:
   applying a minimum shear rate of $10^2$ $s^{-1}$ or more to at least one of a first base oil comprising a first thickener precursor and a second base oil comprising a second thickener precursor;
   mixing the first base oil and the second base oil while keeping the minimum shear rate to prepare a mixture solution; and
   forming a thickener in the mixture solution.

7. The grease manufacturing method according to claim 6, wherein:
   in a single reactor, the minimum shear rate of $10^2$ $s^{-1}$ or more is applied to the first base oil comprising the first thickener precursor, and the minimum shear rate of $10^2$ $s^{-1}$ or more is applied to the second base oil comprising the second thickener precursor;
   the first base oil and the second base oil are mixed while keeping the minimum shear rate for each of the first and second base oils to prepare the mixture solution; and
   the thickener is formed in the mixture solution.

8. The grease manufacturing method according to claim 6, wherein:
   the minimum shear rate of $10^2$ $s^{-1}$ or more is applied to the first base oil comprising the first thickener precursor;
   while keeping the minimum shear rate, the second base oil comprising the second thickener precursor is added to the first base oil to prepare the mixture solution; and
   the thickener is formed in the mixture solution.

9. The grease manufacturing method according to claim 6, wherein a time for keeping the minimum shear rate for the mixture solution comprising the first base oil and the second base oil at $10^2$ $s^{-1}$ or more is at least 0.002 seconds.

10. The grease manufacturing method according to claim 6, wherein the minimum shear rate for the mixture solution is $10^7$ $s^{-1}$ or less.

11. The grease manufacturing method according to claim 6, wherein a ratio (Max/Min) of a maximum shear rate (Max) to the minimum shear rate (Min) in a shear rate applied to the mixture solution is 50 or less.

12. The grease manufacturing method according to claim 6, wherein:
   the first thickener precursor is a monoamine and the second thickener precursor is a diisocyanate; or
   the first thickener precursor is a diisocyanate and the second thickener precursor is a monoamine.

13. The grease manufacturing method according to claim 6, wherein the minimum shear rate is applied to the mixture solution by introducing the mixture solution into a reactor configured to generate shearing by a relative motion between facing wall surfaces.

14. The grease manufacturing method according to claim 6, further comprising:
   heating the grease to a temperature of 80 degrees C. or more.

15. A grease, comprising a thickener formed by shearing a mixture solution of a monoamine compound and a diisocyanate compound at a minimum shear rate of $10^2$ $s^{-1}$ or more, wherein:
the monoamine compound is at least one of an aliphatic monoamine and an aromatic monoamine; and
A (unit: μm) representing a volumetric-based arithmetic mean particle size of particles comprised in the grease calculated using laser diffraction/scattering method satisfies a formula (1):

$$A \leq 1.6 \tag{1}$$

16. The grease according to claim 15, wherein a ratio of a value ($V_S$) of measurements of a Level High32-64s of the urea grease according to a FAG method, and a value ($V_N$) of measurements of a Level High32-64s of the urea grease obtained by shearing the mixture solution at a minimum shear rate of less than $10^2$ s$^{-1}$ satisfies:

$$V_S/V_N \leq 0.9.$$

17. The grease according to claim 15, wherein a ratio of a value ($V_S$) of measurements of a Level High32-64s of the urea grease according to a FAG method, and a value ($V_N$) of measurements of a Level High32-64s of the urea grease obtained by a reaction, in which a ratio (Max/Min) of a maximum shear rate (Max) to the minimum shear rate (Min) applied to the mixture solution is controlled to be 70 or more, satisfies:

$$V_S/V_N \leq 0.9.$$

18. The grease according to claim 15, wherein the mixture solution is prepared by mixing a first base oil comprising the monoamine compound and a second base oil comprising the diisocyanate compound.

19. The grease according to claim 15, wherein the monoamine compound comprises a chain aliphatic monoamine having 6 to 20 carbon atoms.

20. The grease according to claim 15, wherein the monoamine compound comprises octyl amine.

21. The grease according to claim 15, wherein the monoamine compound comprises tolyl amine.

22. The grease according to claim 15, wherein the minimum shear rate is $10^7$ s$^{-1}$ or less.

* * * * *

UNITED STATES PATENT AND TRADEMARK OFFICE
CERTIFICATE OF CORRECTION

| | | |
|---|---|---|
| PATENT NO. | : 10,704,010 B2 | Page 1 of 1 |
| APPLICATION NO. | : 15/549036 | |
| DATED | : July 7, 2020 | |
| INVENTOR(S) | : Yoshiyuki Suetsugu et al. | |

It is certified that error appears in the above-identified patent and that said Letters Patent is hereby corrected as shown below:

On the Title Page

Item (71), the Applicant's name is incorrect. Item (71) should read:
-- (71) Applicant: IDEMITSU KOSAN CO., LTD., Chiyoda-ku, (JP) --

Item (73), the Assignee's name is incorrect. Item (73) should read:
-- (73) Assignee: IDEMITSU KOSAN CO., LTD., Chiyoda-ku, (JP) --

Signed and Sealed this
Third Day of November, 2020

Andrei Iancu
*Director of the United States Patent and Trademark Office*